Patented May 11, 1926.

1,584,479

UNITED STATES PATENT OFFICE.

GENZO SHIMADZU, OF KYOTO, JAPAN.

PROCESS OF MAKING PLATES FOR STORAGE BATTERIES USING LEAD SUBOXIDE.

No Drawing.   Application filed February 20, 1923. Serial No. 620,267.

This invention relates to a process of manufacturing plates for storage batteries characterized by using as the principal active material lead suboxide ($Pb_2O$), mixing the same with water or dilute sulphuric acid, kneading the mixture and coating or filling in the plates or grids with the paste thus formed. The object of this invention is to obtain durable plates for storage batteries by causing the lead suboxide to convert easily to hydroxide while drying.

Plates for storage batteries, according to methods hitherto known, are generally manufactured by coating or filling in the plates or grids with a paste formed by kneading a lead oxide, such as litharge minium, together with dilute sulphuric acid, but in such method, the chemical change that occurs in the lead oxide, and the drying of the paste must be so regulated that they progress parallel. Otherwise, the paste, losing its volume by drying, will crack, and interspaces will be formed between the coating and the plate or grid, thus shortening the life of the battery. Moreover, when drying the paste, as it does not undergo any structural change, as hardening of cement by hydration, it is very difficult to make batteries that last long.

According to this invention, a very fine and spongy lead suboxide of an apparent specific gravity of not more than 3 is utilized as active material, and is applied to the plate, or grid, after kneading the same in water or dilute sulphuric acid, into a paste. After application to the plate or grid and when drying, such paste will be acted upon by water and oxygen in the air, and will be converted into lead hydroxide and will increase its volume which, counteracting the shrinkage due to drying, removes the drawback of cracking. Moreover, when the suboxide is converted into hydroxide, a marked change in the construction of the paste takes place and the paste hardens in the same condition as cement hardens by hydration, and thus very durable batteries can be manufactured.

The lead suboxide used in this invention, is formed by reducing metallic lead into fine, spongy powder by mechanical abrasion. It is chiefly composed of lead suboxide, but is sometimes intermingled, from the nature of the process to manufacture it with 1 to 40% metallic lead powder. Also, from the nature of lead suboxide, it is slowly converted, while being manufactured or when it is left exposed to the air, into monoxide, and consequently it is sometimes intermingled with lead monoxide. But such lead monoxide formed by oxidation in a warm room in the atmosphere retains, different from monoxide formed by igniting lead powder, an apparent specific gravity of the suboxide used as the material, easily hardens, is rich in activity and forms a durable plate. Consequently, even when lead suboxide is slowly oxidized while it is stored, such oxide in no way obstructs the carrying of this invention into effect.

Thus, in my invention, the lead suboxide used as material, is manufactured without using any water; there is little chance for any impurities to intermingle therewith during the process of manufacture; and there is no necessity of adding to the lead suboxide when kneading the same into paste in order to lengthen the life thereof any drug prejudicial to batteries. Moreover, the process of "forming" may be entirely dispensed with, plates being "formed" when the battery is charged with electricity for the first time. Of course, the process of "forming" may be carried out according to the ordinary method.

To explain my invention more in detail, the following is an example of carrying it into practice:—

Pieces of metallic lead are reduced to fine powder by causing the pieces to rub against one another in a slowly revolved drum, and the powder is then exposed to the air. Then take 300 grammes of such powder, which is very fine and light, having an apparent specific gravity of not more than 3, mix it with 45 cubic centimeters of water, knead the mixture and with the paste thus formed coat or fill the ordinary plates or grids. When the plates are dry, they are ready to be used for storage batteries. Apparent specific gravity is measured by filling a vessel of known capacity with lead suboxide powder by causing the powder to fall from a sieve, smooth the surface softly without pressing, and weigh it. Then, take weight of water of 4° C. of the same volume, and divide the weight of the former by that of the latter, and the quotient is the apparent specific gravity sought.

Claims:

1. The process of preparing plates for storage batteries, which consists in reducing metallic lead to a fine powder, exposing said powder to the air, mixing the same with liquid, kneading the mixture into the form of a paste, coating the plates with said paste, and drying the same thereby to convert the lead suboxide into lead monoxide and lead hydroxide.

2. The process of preparing plates for storage batteries, which consists in reducing metallic lead to a fine powder, exposing the same to the air, mixing 300 grammes of said powder with 45 cubic centimeters of water, kneading the mixture to form a paste, coating the plates with said paste, and drying the same thereby to convert the lead suboxide into lead monoxide and lead hydroxide.

3. A process of manufacturing plates for storage batteries, consisting in kneading lead suboxide intermingled with lead monoxide and sufficient liquid to form a paste and applying the same to or filling therewith the plates or grids.

4. A process of manufacturing plates for storage batteries, consisting in kneading lead suboxide intermingled with lead monoxide, metallic lead, and sufficient liquid to form a paste, and applying the same to or filling therewith the plates or grids.

In testimony whereof I have signed my name to this specification.

GENZO SHIMADZU.